(12) United States Patent
Burd

(10) Patent No.: US 9,322,288 B2
(45) Date of Patent: Apr. 26, 2016

(54) PRESSURE SEAL WITH NON-METALLIC WEAR SURFACES

(71) Applicant: United Technologies Corporation, Hartford, CT (US)

(72) Inventor: Steven W. Burd, Cheshire, CT (US)

(73) Assignee: United Technologies Corporation, Hartford, CT (US)

( * ) Notice: Subject to any disclaimer, the term of this patent is extended or adjusted under 35 U.S.C. 154(b) by 683 days.

(21) Appl. No.: 13/688,340

(22) Filed: Nov. 29, 2012

(65) Prior Publication Data

US 2014/0147271 A1     May 29, 2014

(51) Int. Cl.
*F01D 11/00*     (2006.01)
*F16J 15/54*     (2006.01)

(52) U.S. Cl.
CPC .............. *F01D 11/005* (2013.01); *F16J 15/54* (2013.01); *F05D 2300/432* (2013.01); *Y02T 50/672* (2013.01)

(58) Field of Classification Search
CPC ...... F01D 11/02; F01D 11/005; F16J 15/447; F16J 15/4472; F16J 15/4476; F16J 15/54; F16J 15/453
USPC ............... 277/412–420, 637–640; 415/174.5, 415/214.1
See application file for complete search history.

(56) References Cited

U.S. PATENT DOCUMENTS

| | | | |
|---|---|---|---|
| 3,692,097 A | 9/1972 | Penny | |
| 4,179,130 A | 12/1979 | Fass et al. | |
| 4,289,446 A | 9/1981 | Wallace | |
| 4,460,185 A | 7/1984 | Grandey | |
| 4,486,002 A | 12/1984 | Riess et al. | |
| 4,704,332 A | 11/1987 | Brennan et al. | |
| 5,407,319 A * | 4/1995 | Harrogate et al. | 415/115 |
| 5,417,545 A * | 5/1995 | Harrogate | 415/115 |
| 6,076,835 A * | 6/2000 | Ress et al. | 277/637 |
| 6,283,479 B1 | 9/2001 | Jan | |
| 6,899,339 B2 | 5/2005 | Sanders et al. | |
| 7,264,442 B2 * | 9/2007 | Harding | 415/173.7 |
| 7,467,495 B2 | 12/2008 | Reineke | |
| 7,562,880 B2 | 7/2009 | Paptrotna et al. | |
| 8,061,978 B2 | 11/2011 | Tholen et al. | |
| 2005/0220611 A1 * | 10/2005 | Bhate et al. | 415/173.3 |
| 2006/0123797 A1 * | 6/2006 | Zborovsky et al. | 60/800 |
| 2009/0194945 A1 | 8/2009 | Bhat et al. | |
| 2009/0277642 A1 | 11/2009 | Curington | |
| 2012/0292860 A1 * | 11/2012 | Moehrle et al. | 277/640 |

* cited by examiner

*Primary Examiner* — Igor Kershteyn
*Assistant Examiner* — Woody A Lee, Jr.
(74) *Attorney, Agent, or Firm* — Carlson, Gaskey & Olds

(57) ABSTRACT

A gas turbine engine has a pair of components having a high-pressure chamber on one side, and a low pressure chamber on an opposed side. A three-sided seal has one side in sealing contact with each of said components. A third side is associated with a third component. At least one non-metallic wear surface is positioned between one of the three sides of the seal and its respective component.

10 Claims, 2 Drawing Sheets

PRESSURE SEAL WITH NON-METALLIC WEAR SURFACES

STATEMENT REGARDING FEDERALLY SPONSORED RESEARCH OR DEVELOPMENT

This invention was made with government support under Contract No. N00019-02-C-3003 awarded by the United States Navy. The Government has certain rights in this invention.

BACKGROUND

This application relates to a pressure seal having three surfaces in sliding contact, with at least one of the surfaces being provided with a non-metallic wear surface.

Gas turbine engines are known, and typically include a fan delivering air into a compressor. The air is compressed in the compressor, and delivered into a combustion section. The air is mixed with fuel in the combustion section and ignited. Products of the combustion pass downstream over turbine rotors, driving them to rotate.

There are a number of areas within a gas turbine engine where a high pressure chamber must be maintained separate from a low pressure chamber. Thus, various locations require a reliable seal.

One type of seal is a U or J-shaped seal having three sides. Two components contact two of the sides of the seal, and some form of retention member may contact a third side. The seal is generally moveable along the three surfaces.

In the past, seals in this particular application have always been formed of metallic materials. This has led to undue wear.

While non-metallic seals have been proposed for many applications, they have not been proposed in gas turbine engines between high and low pressure chambers, where a three sided sealing application is used.

SUMMARY

In a featured embodiment, a gas turbine engine has a pair of components having a high-pressure chamber on one side, and a low pressure chamber on an opposed side. A three sided seal has one side in sealing contact with each of the components. A third side is associated with a third component. There is at least one non-metallic wear surface between one of the three sides of the seal and its respective component.

In another embodiment according to the previous embodiment, there are non-metallic wear surfaces between each of the three sides of the seal and a respective component.

In another embodiment according to any of the previous embodiments, one of the components may be a liner segment of the exhaust system in the gas turbine engine.

In another embodiment according to any of the previous embodiments, another component may be a moving liner segment.

In another embodiment according to any of the previous embodiments, the third component may be a retention element for positioning the seal.

In another embodiment according to any of the previous embodiments, one of the components may be a case segment for the gas turbine engine.

In another embodiment according to any of the previous embodiments, one of the components may be a duct segment for the gas turbine engine.

In another embodiment according to any of the previous embodiments, the wear surface is on the seal.

In another embodiment according to any of the previous embodiments, the wear surface is on at least one of the components.

In another embodiment according to any of the previous embodiments, the third side may sometimes be in contact with the third component, and sometimes be spaced from the third component during different operational points in the operation of the gas turbine engine.

These and other features of this application will be best understood from the following specification and drawings, the following of which is a brief description.

DETAILED DESCRIPTION

Figure 1:
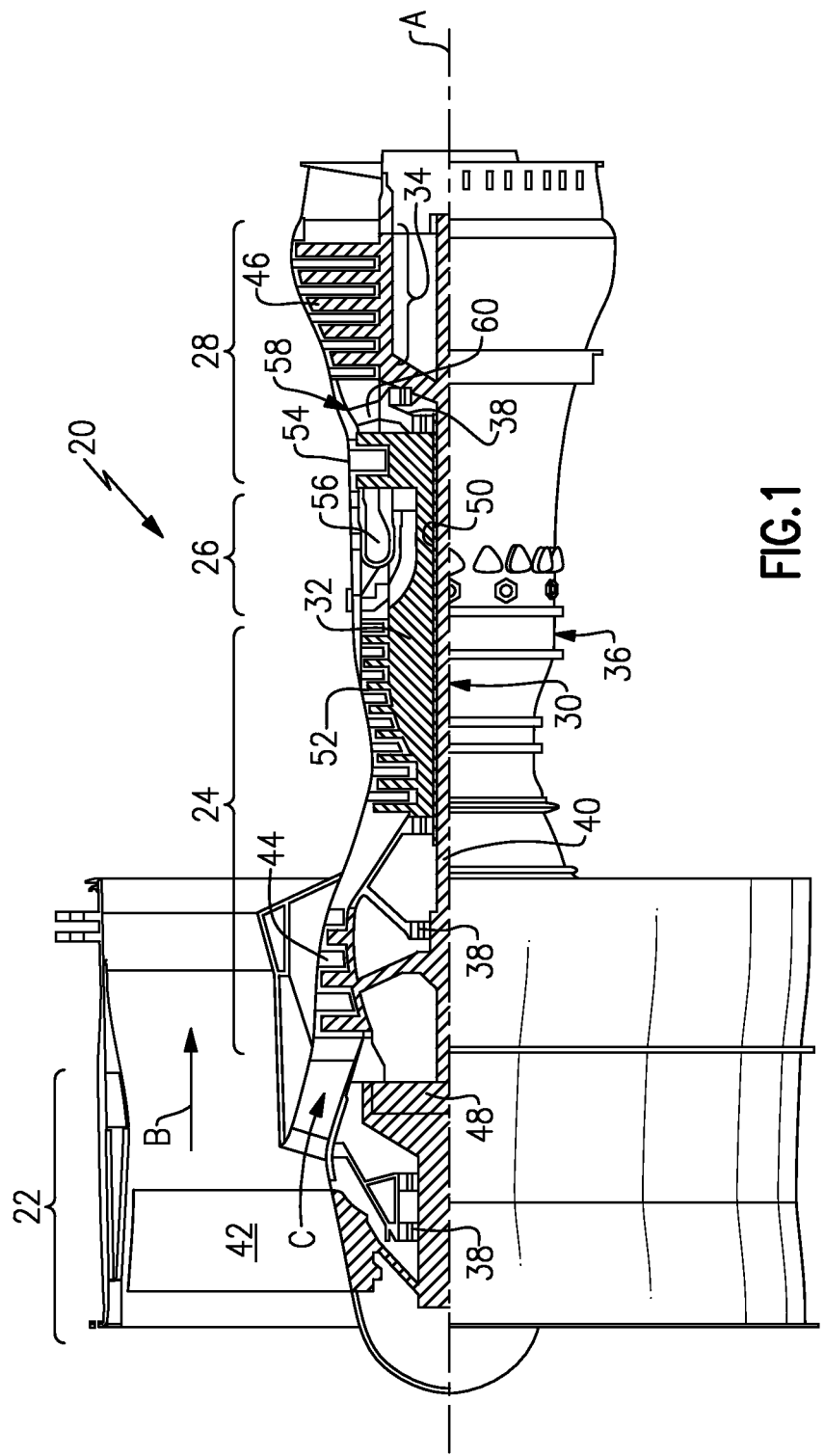
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B in a bypass duct defined within a nacelle 15, while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm (pounds mass) of fuel being burned divided by lbf (pounds force) of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
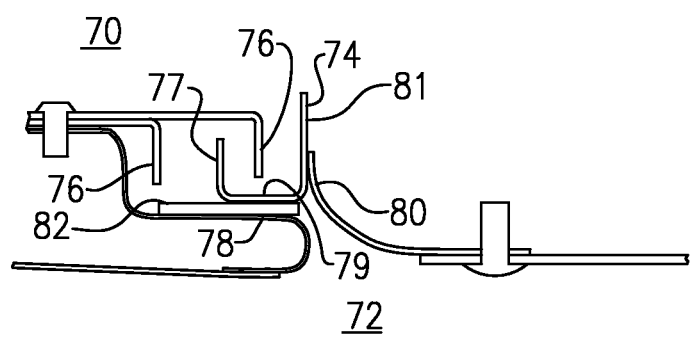
FIG. 2 shows a location in the FIG. 1 gas turbine engine receiving a seal.

FIG. 2 shows a location within a gas turbine engine, which may be in a nozzle portion of the gas turbine engine, downstream of the turbine section 28. A high pressure area 70 is separated from a lower pressure area 72 by a seal 74. Seal 74 has three sides 77, 79 and 81, all of which may be in contact with a seal surface on an associated component 76, 78 and 80. As shown, the sides 77, 79 and 81 may be also out of contact with a component 77, 78 and 80 but each face a component.

Component 78 may be a static liner segment of an exhaust system, and has a sealing surface 82 positioned to be in contact with the surface 79 on the seal 74. A pair of retention elements 76 face, and may contact, the surface 77 on the seal 74. As shown in FIG. 2, the retention elements 76 may also be spaced away from the surface 77 on the seal 74 under much of its operational life. Another component 80 may be a moving liner segment, and have an end surface in contact with a surface 81 on the seal 74.

In other embodiments, one of the components may be a case segment for a gas turbine engine, or a duct segment for a gas turbine.

Figure 3A:
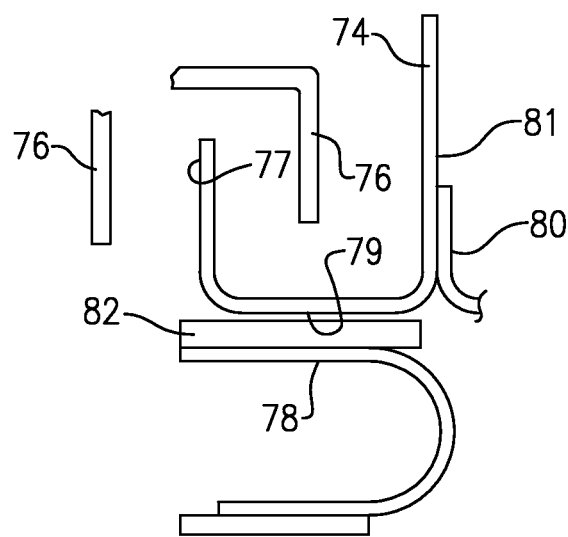
FIG. 3A shows a first seal embodiment.

FIG. 3A is an enlarged view of the seal embodiment.

As shown in FIG. 3A, the seal floats between the three surfaces, and as it moves there is wear. Thus, the provision of a non-metallic wear surface 82 between the surfaces 78 and 79 provides longer life for the seal and the components.

In embodiments, wear surfaces may be applied on each of the components 76, 80, and 78. The wear surfaces may be polytetraflouroethylene (PTFE) or thermoplastic polymer or other appropriate non-metallic materials. The non-metallic surfaces may be formed of carbon, silicon, ceramic or other composite-based materials and may be selected due to wear and lubrication characteristics. The materials may be applied as pads, segmented strips, or continuous strips.

Figure 3B:
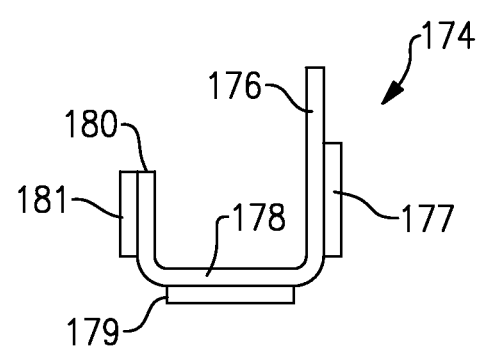
FIG. 3B shows another seal embodiment.

FIG. 3B shows another embodiment 174. In embodiment 174, the three sides 176, 178 and 180 of the seal receive non-metallic pads 177, 179 and 181, respectively.

The pads or other non-metallic materials may be mechanically secured to the seal or other components via rivets, fasteners, and etcetera.

Further, the entire seal may be formed of non-metallic materials, or alternatively, the members 76, 78 and 80 may be formed of non-metallic materials. That is, there need not be a non-metallic material secured to the underlying substrate, but rather the substrate itself may be formed of the non-metallic materials.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a first component and a second component, said first and second components having a high-pressure chamber on one side, and a low pressure chamber on an opposed side, and a three sided seal having one side facing each of said first and second components, and having a third side facing a third component, and there being at least one non-metallic wear surface between one of said three sides of said seal and said facing component; and
   said three sided seal floating relative to each of said first, second and third components; and such that it is movable relative to each of said components wherein one of said components is a liner segment of an exhaust system in the gas turbine engine.

2. The gas turbine engine as set forth in claim 1, wherein there are non-metallic wear surfaces between each of the three sides of said seal and said facing component.

3. The gas turbine engine as set forth in claim 1, wherein another said component is a moving liner segment.

4. The gas turbine engine as set forth in claim 3, wherein said third component is a retention element for positioning the seal.

5. The gas turbine engine as set forth in claim 4, wherein said retention segment has a pair of retention elements on opposed position faces of one of said three sides of said seal.

6. The gas turbine engine as set forth in claim 1, components is also a case segment for the gas turbine engine.

7. The gas turbine engine as set forth in claim 1, components is also a duct segment for the gas turbine engine.

8. The gas turbine engine as set forth in claim 1, wherein said wear surface is on the seal.

9. The gas turbine engine as set forth in claim 1, wherein said wear surface is on at least one of the components.

10. The gas turbine engine as set forth in claim 1, wherein said third side may sometimes be in contact with said third component, and sometimes be spaced from said third component during different operational points in the operation of the gas turbine engine.

* * * * *